United States Patent [19]

Hashimoto

[11] Patent Number: 5,172,939
[45] Date of Patent: Dec. 22, 1992

[54] CONNECTION STRUCTURE FOR BRANCH PIPE IN HIGH-PRESSURE FUEL RAIL

[75] Inventor: Yoshiyuki Hashimoto, Tagata, Japan

[73] Assignee: Usui Kokusai Sangyó Kaisha Ltd., Japan

[21] Appl. No.: 595,532

[22] Filed: Oct. 11, 1990

[30] Foreign Application Priority Data

Oct. 14, 1989 [JP] Japan .................. 1-120416[U]

[51] Int. Cl.⁵ .................................. F16L 35/00
[52] U.S. Cl. ....................... 285/24; 285/197; 285/334.4; 285/906
[58] Field of Search .............. 285/334.4, 156, 197, 285/334.1, 24, 906

[56] References Cited

U.S. PATENT DOCUMENTS

| | | |
|---|---|---|
| Re. 6,488 | 6/1875 | Van Duzer . |
| 966,870 | 8/1910 | Stoddard . |
| 1,398,985 | 12/1921 | Wadley ............... 285/334.4 X |
| 2,098,669 | 11/1937 | Moffitt . |
| 2,360,359 | 10/1944 | Meyers . |
| 2,600,162 | 6/1952 | Frontz ............... 285/334.4 |
| 3,036,674 | 5/1962 | Branin . |
| 3,362,731 | 1/1968 | Gasche et al. ............... 285/356 X |
| 3,437,357 | 4/1969 | Rubin . |
| 4,073,513 | 2/1978 | Blakely . |
| 4,540,205 | 9/1985 | Watanabe . |
| 4,832,376 | 5/1989 | Sugao . |
| 4,893,601 | 1/1990 | Sugao . |
| 4,900,180 | 2/1990 | Takikawa . |

FOREIGN PATENT DOCUMENTS

| | | |
|---|---|---|
| 2334445 | 5/1974 | Fed. Rep. of Germany . |
| 2744345 | 4/1979 | Fed. Rep. of Germany ... 285/334.4 |
| 863390 | 3/1961 | United Kingdom ............. 285/334.4 |
| 2045376 | 10/1980 | United Kingdom ............. 285/334.4 |

Primary Examiner—Dave W. Arola
Attorney, Agent, or Firm—Anthony J. Casella; Gerald E. Hespos

[57] ABSTRACT

In causing a pressure head portion on the terminal of a branch pipe to be abutted and tightly pressed against a pressure receiving bearing surface formed in a through hole in a high-pressure fuel rail, the pressure bearing surface is formed in the shape of a spherical surface having a curvature radius ($\gamma$) of 0.4D to 10D, wherein D is the diameter of the branch pipe. Since the branch pipe has such a spherical pressure bearing surface, a uniform surface pressure can be obtained should the branch pipe be installed in an inclined state, and such an inclination or eccentricity can be rectified by the shapes of the pressure receiving bearing surface and the pressure bearing surface to provide a uniform surface pressure.

8 Claims, 4 Drawing Sheets

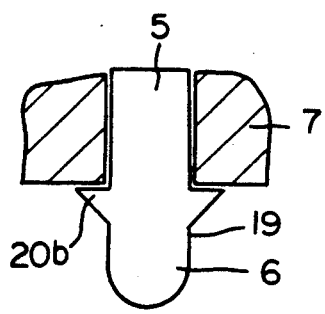
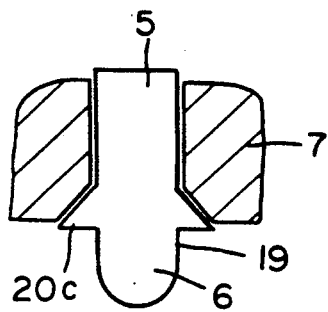
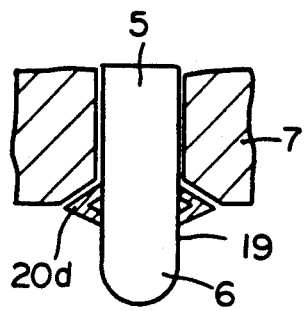
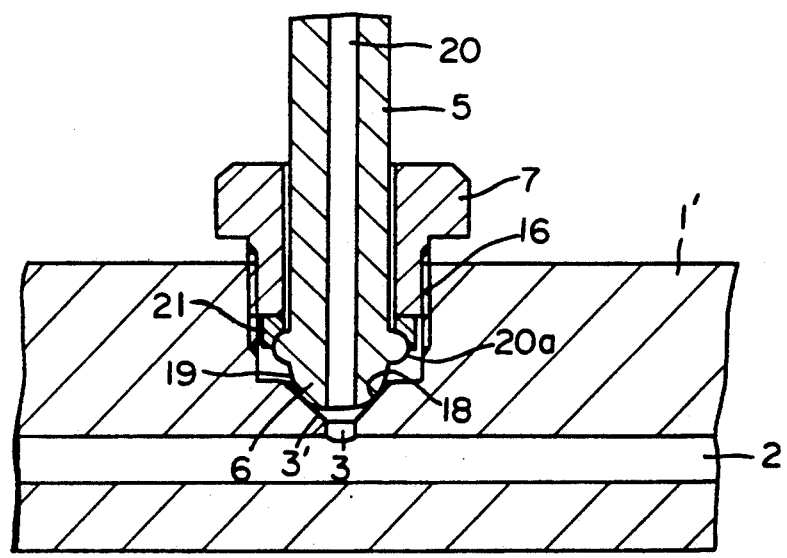

CONNECTION STRUCTURE FOR BRANCH PIPE IN HIGH-PRESSURE FUEL RAIL

BACKGROUND OF THE INVENTION

1. Field of the Invention

The present invention relates to a connection structure for a branch pipe in a high-pressure fuel rail such as a high-pressure fuel manifold or a fuel block, and more particularly to a connection structure for a branch pipe in a high-pressure fuel rail serving to pass a fuel under a pressure exceeding 1,000 kgf/cm² to an internal combustion diesel engine.

2. Description of the Prior Art

FIG. 10 is a front view including sectional portions showing a connection structure in a manifold as a conventional high-pressure fuel rail, wherein a through passage (10) is formed to serve to pass a high-pressure fuel through a main pipe (11) and a plurality of through holes (13) are fromed in the axial direction of the through passage (10) (FIG. 10 shows only one through hole (13)).

A branch pipe (14) is inserted in each of the through holes (13), and said branch pipe (14) and the main pipe (11) are fixed together at a joint (W) by means of soldering or welding so that the through passage (10) in the main pipe (11) communites with a flow path (12) in the branch pipe (14).

In the connection structure for said branch pipe in the conventional high-pressure fuel manifold, the union of the joint (W) or portions subject to heat in the vicinity of the joint (W) often suffers a separation because these portions are exposed to repeated application of an ultra-high fluid pressure exceeding 1,000 kgf/cm² and to incessant exertion of vibrations generated by the diesel internal combustion engine, thus resulting in fuel scattering or leakage and the separation of the branch pipe (14).

SUMMARY OF THE INVENTION

The present invention has been made in view of the status of said connection structure for a branch pipe of this nature. An object of this invention is therefore to provide a connection structure which enables branch pipes to be easily connected to a high-pressure fuel rail without welding or soldering and which ensures a perfect connection even when the joined protions are exposed to repeated application of an ultra-high fluid pressure and incessant exertion of vibrations from the engine.

In order to achieve said object, the present invention is directed to the connection structure for branch pipes in a high-pressure fuel rail in which through holes are formed at a plurality of positions in the axial direction in the peripheral wall of a through passage formed axially in said rail and serving to pass a high-pressure fuel and in which outwardly opening pressure receiving bearing surfaces on each are formed in said through holes so that branch pipes having a flow path communicating with said through passage are provided, said pressure receiving bearing surfaces one each being abutted by each of the pressure head portions formed on the conneciton terminals of said branch pipes which are fixed to said fuel rail by means of a nut incorporated on the side of each of said branch pipes, which connection structure is so designed that a spherical pressure bearing surface is formed on the end of said pressure head portion, a straight line portion is formed on said pressure head portion in continuity with said pressure bearing surface in parallel with the axis, and an annular projection which comes in contact with said nut is provided at the end of said straight line portion, the curvature radius ($\gamma$) of the pressure bottom surface being set at 0.4 D to 10 D, wherein D is the diameter of said branch pipe.

In the present invention, since the spherical pressure bearing surface is formed on the end of pressure head portion formed on the terminal of branch pipes, even if said branch pipe is slightly slanted toward the fuel rail and installed with the slant being not rectified, the pressure bearing surface keeps a circular line contact state with the pressure receiving bearing surface consisting of the surface of revolution thus providing a uniform surface pressure to ensure positive sealing of the contact surfaces.

On the other hand, even when the branch pipe is slightly eccentric or inclined, the eccentricity or slanting of the branch pipe is automatically rectified by the spherical surface of the pressure bearing surface as it slides on the surface of revolution of the pressure receiving bearing surface before the surface pressure is increased on the sealing surface by tightening torque of the clamping nut, thus providing a uniform surface pressure since the straight line portion is formed on the pressure head portion in continuity with the pressure bearing surface in parallel with the axis, if a guide for this straight line portion is formed on the joint piece, precise installation can be performed accurately as the pressure head portion does not interfere with the fuel rail.

Installation is easily performed by fixing the branch pipe to the fuel rail with the nut after the pressure head portion of the branch pipe is abutted to the pressure receiving bearing surface, but a construction may be adopted that permits the branch pipe to be fixed to the fuel rail with a box nut which is meshed with threads formed on the outer periphery of the joint piece.

BRIEF DESCRIPTION OF THE DRAWINGS

FIGS. 2 is a side view including sectional portions, and FIGS. 3 and 4 are diagrams showing principal portions.

FIGS. 5 through 7 are diagrams illustrating principal portions of the embodiment shown in FIGS. 2 through 4, respectively.

FIGS. 8 and 9 are diagrams equivalent to FIG. 2 showing other embodiments, respectively.

DETAILED DESCRIPTION OF PREFERRED EMBODIMENTS

By reference to FIGS. 1 through 9, the following will explain about the embodiments of the present invention.

Figure 1:
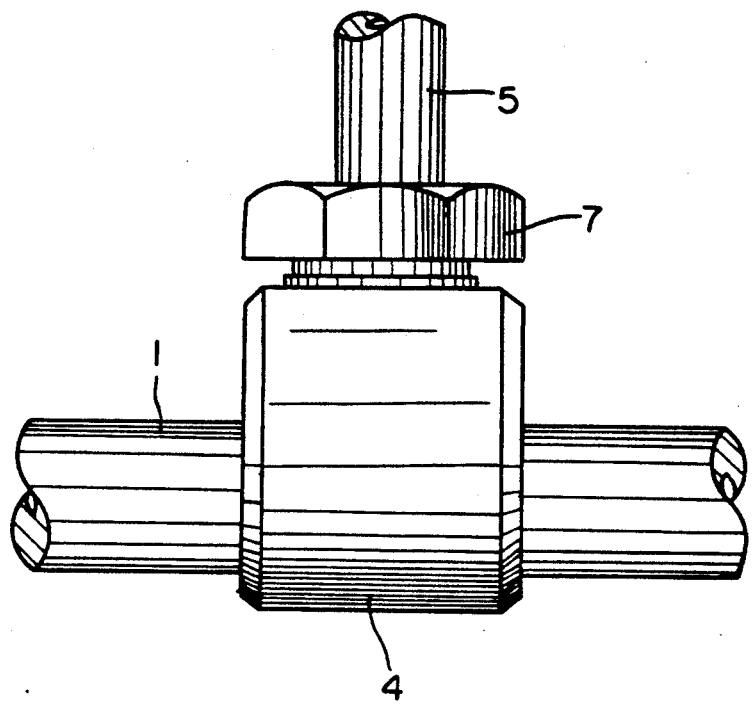
FIG. 1 is a side view showing the first embodiment of of the present invention.
Figure 2:
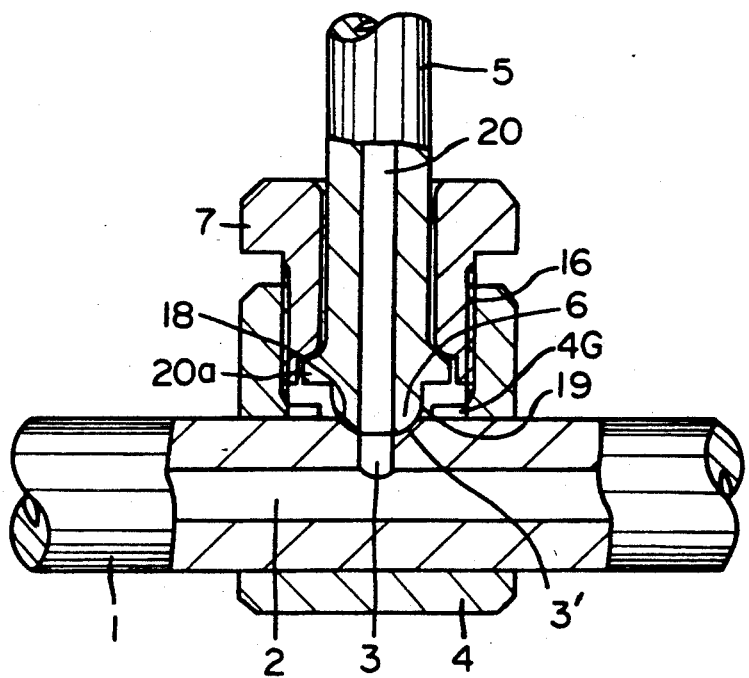
FIGS. 2 through 4 are diagrams illustrating the first embodiment of the present invention.
Figure 3:
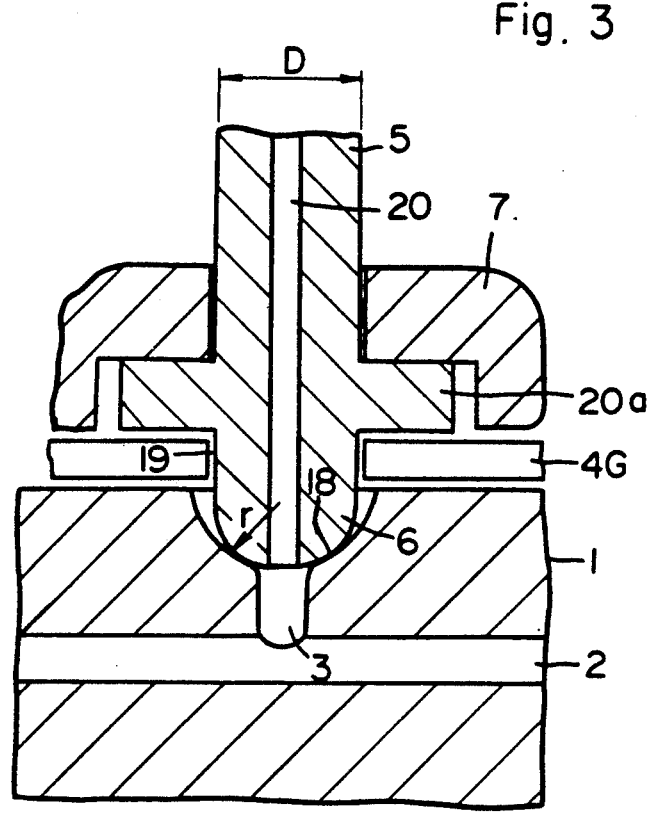
Figure 4:
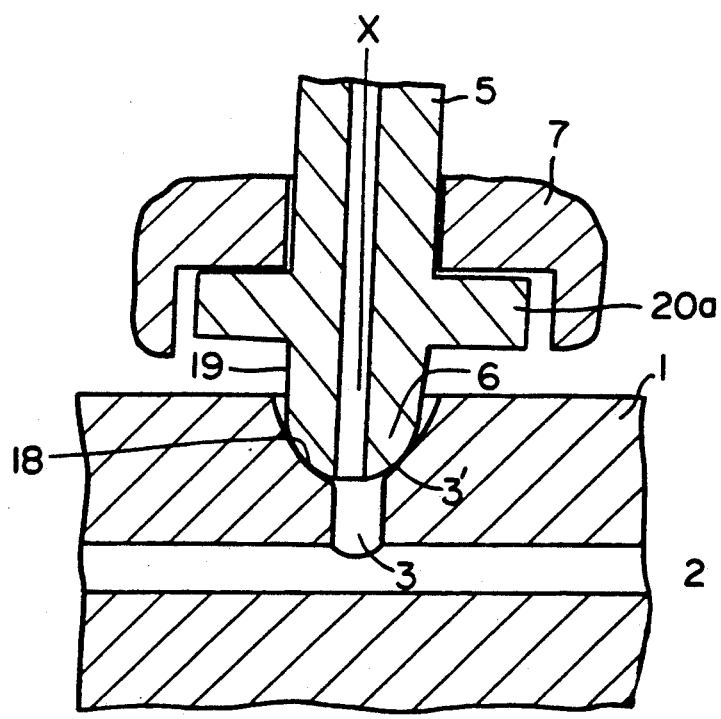
Figure 9:
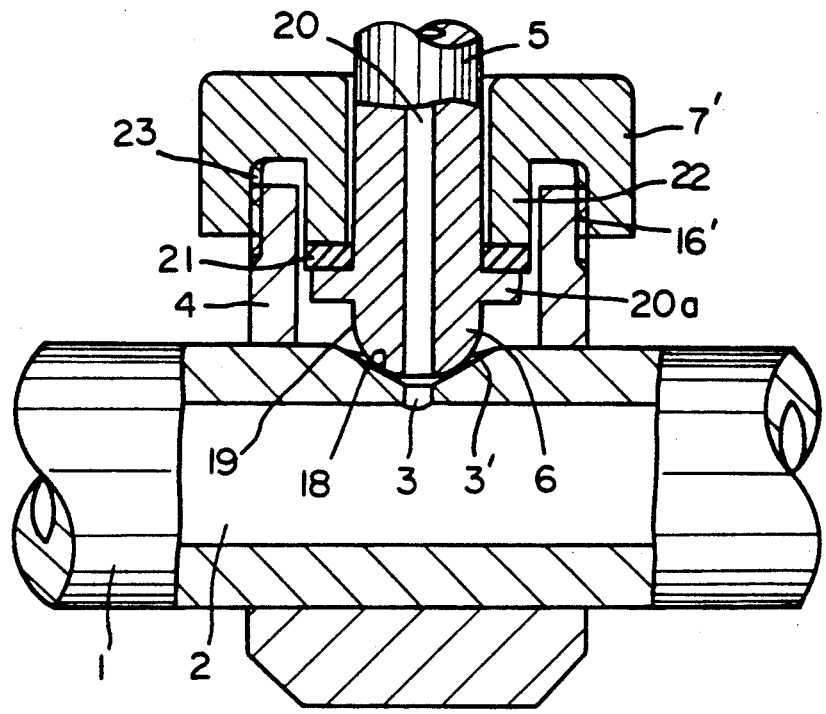
Figure 10:
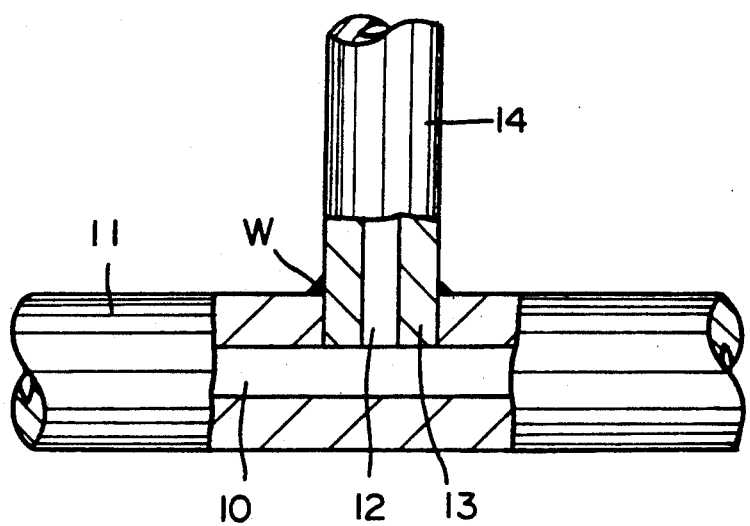
FIG. 10 is a front view including sectional portions showing the conventional connection structure for a branch pipe in a high-pressure fuel rail.

FIG. 1 is a side view showing each of the embodiments; FIG. 2 is a side view including sectional portions showing the first embodiment; FIGS. 3 and 4 are diagrams showing principal portions of the first embodiment; FIGS. 5 through 7 are diagrams showing principal portions of the second and fourth embodiments, respectively; and FIGS. 8 and 9 are diagrams equivalent to FIG. 2 showing other embodiments, respectively.

As illustrated in FIG. 1, a branch pipe (5) is fastened with a nut (7) at a joint piece (4) perpendicularly to the axial direction of a main pipe (1) provided as a fuel rail. As illustrated in FIG. 2, a through passage (2) is formed in a comparatively thick-walled metal main pipe (1) with an outside diameter of 20 mm and a wall thickness of 6 mm for example, a though hole (3) is formed in the through passage (2), and at the end of the through hole (3) is formed an outwardly opening pressure receiving bearing surface (3') in the shape of a surface of revolution on the axis of the through hole (3), namely a conical surface, a circular arc surface of revolution, an elliptical surface of revolution, a parabolic surface of revolution, a hyperbolic surface of revolution, etc.

A joint piece is externally fitted on the main pipe (1) so as to enclose the pressure receiving bearing surface (3'), and a threaded hole (16) is formed on the joint piece (4).

On the terminal of the branch pipe (5) is formed a pressure head portion (6), on the end of which is formed a spherical pressure bearing surface (18) as illustrated in FIG. 3, and in continuity with the pressure bearing surface (18), a straight line portion (19) is formed in parallel with the axis. At the terminal of the straight line portion (19) is formed an annular projection (20a) in the shape of a torus. And, a guide (4G) for guiding the straight line portion (19) is provided on said joint piece (4).

In the first embodiment of the present invention, the curvature radius ($\gamma$) of the pressure bearing surface (18) is set within the range of $0.4\ D \leq \gamma \leq 10\ D$ ... (1) in relation to the diameter (D) of the branch pipe (5). If the curvature radius is less than 0.4 D, the pressure bearing surface (18) is caused to break through the pressure receiving bearing surface (3') by the tightening torque of the clamping nut (7), but if it exceeds 10 D, the pressure bearing surface (18) is brought close to a straight line and an self-rectifying action by the spherical surface as described below can no longer be expected. A preferable range of the curvature radius is $0.4\ D \leq \gamma \leq 4D$.

The branch pipe (5) and the main pipe (1) are joined by causing the pressure bearing surface (18) of the pressure head portion (6) of the branch pipe (5) to be tightly pressed against the pressure receiving bearing surface (3') by means of the nut (7) meshed with the threaded hole (16) and allowing the pressure bearing surface (18) and the pressure receiving bearing surface (3') to be imobilized against each other by means of fast engagement achieved as the end portion of the nut (7) presses the annular projection (20a) via a washer (21) provided as necessary, so that the through passage (2) in the main pipe (1) is hermetically branched by the flow path (20) in the branch pipe (5).

In this case, a sealing member made of indium, silver, copper, brass or aluminium may be interposed between the pressure head portion (6) and the pressure receiving bearing surface (3').

In the first embodiment of this invention, when the branch pipe (5) is slightly slanted toward the axial direction (x) and installed in that restrained state, the pressure bearing surface (18) keeps a circular line contact state with the pressure receiving bearing surface (3') consisting of the surface of revolution, so that the branch pipe (5) always maintains a stable position in relation to the main pipe (1) to provide a uniform surface pressure. On the other hand, when the branch pipe (5) is slightly slanted from the axial direction (x) or moved eccentrically for some reason or other as illustrated in FIG. 4, the spherical surface of the pressure head portion (6) slides on the surface of revolution of the pressure receiving bearing surface to correct the slanting or eccentricity of the branch pipe (5) so as to set said pipe at the specified position (a self-rectifying action) before the surface pressure on the sealing surface is increased as the tightening torque of the clamping nut (7) applies a pressure to the annular projection (20a), so that a uniform surface pressure is obtained on the sealing surface to ensure safe supply of an ultra-high pressure fuel without leakage.

When a guide (4G) which guides the straight line portion (19) of the pressure head portion (6) is formed in the joint piece (4), the branch pipe (5) can be easily positioned when it is installed, and by screwing the nut (7) into the threaded hole (16), the branch pipe (5) can be hermetically fixed to the main pipe (1) easily and positively.

Since the pressure bearing surface (18) of the pressure head portion (6) is spherical, the circular line contact between the pressure bearing surface (18) and the pressure receiving bearing surface (3'), which is a surface of revolution, maintains airtightness even when the branch pipe (5) is slightly inclined or eccentric, and as the slanting of the branch pipe (5) is corrected by a self-rectifying action as described above, fuel leakage will not result.

Because the curvature radius ($\gamma$) of the pressure bearing surface (18) of the pressure head portion (6) is set at the value shown by the expression (1), the pressure head portion (6) abuts the pressure receiving bearing surface (3') within the optimum range to ensure complete airtightness.

FIG. 5 is a diagram showing principal portions of the second embodiment of the present invention. In this second embodiment, an annular projection (20b) in the shape of a substantially truncated cone is formed in place of the annular projection (20a) in the shape of a torus used in the first embodiment. The second embodiment can receive a strong fatening pressure of the nut (7).

FIG. 6 is a diagram showing principal portions of the third embodiment of the present invention. In this embodiment, an annular projection (20c) in the shape of a truncated cone is formed reversely to the second embodiment. In the third embodiment, the branch pipe (5) is also aligned when the nut (7) is tightened.

FIG. 7 is a diagram showing principal portions of the fourth embodiment of the present invention. In this embodiment, an annular projection (20d) is formed in the shape of an flexible cylinder. The projection (20d) flexes to prevent excessive deformation when the nut (7) is tightened too much.

The construction and effects of other portions of these second to forth embodiments are the same as those of the first embodiment as described above.

The above embodiments involve the joint piece (4) which is provided externally so as to enclose the pressure receiving bearing surface (3'). The present invention is also applicable to a fuel block (1') as a fuel rail in place of the main pipe (1) as illustrated in FIG. 8. In the embodiment shown in FIG. 8, no joint piece (4) is provided, but a through passage (2) is eccentrically formed in the fuel block (1'), wherein a through hole (3) communicating with the through passage (2), a pressure receiving bearing surface (3') and a threaded hole (16)

are provided in the thicker wall of the fuel block (1'), in which structure a branch pipe (5) is joined by tightening a nut (7) directly into the threaded hole (16) via a washer (21).

Furthermore, the present invention permits the use of a box nut (7') as illustrated in FIG. 9. In this box nut (7'), a cylindrical projection (22) is formed at the central portion, which projection presses an annular projection (20a) down via a washer (21) as the nut (7') is tightened with its inner threaded portion (23) meshed with the outer peripheral threads (16') of a joint piece (4) so as to cause a pressure bearing surface (18) to be tightly pressed against a pressure receiving bearing surface (3').

According to the present invention, even if the branch pipe is installed in an inclined state, a circular line contact state is maintained between the pressure bearing surface and the pressure receiving bearing surface on account of the spherical surface of the pressure bearing surface to provide a uniform surface pressure as descirbed above in details. And, if the branch pipe is eccentric or slanted, the spherical surface of the pressing bearing surface is caused to slide on the pressure receiving bearing surface to correct the eccentricity or slanting of the branch pipe automatically before the surface pressure on the sealing surface is increased by the tightening torque of the clamping nut. Furthermore, it is possible to fix the branch pipe hermetically to the fuel rail by simple operation. Thus, the present invention can provide a connection structure for a branch pipe in a high-pressure fuel rail which is free of fuel scattering or leakage or the separation of the joined parts even when the structure is exposed to repeated application of an ultra-high pressure fuel flow and to incessant exertion of vibrations generated by an internal combustion diesel engine.

What is claimed is:

1. A connection structure for a branch pipe in a high-pressure fuel rail, wherein a through hole is formed at a plurality of positions in the axial direction in the peripheral wall of a through passage formed axially in said rail and serving to pass a high-pressure fuel and wherein an outwardly opening pressure receiving bearing surface is formed in said through hole so that a branch pipe having a flow path communicating with said through passage is provided, said pressure receiving bearing surface being abutted by a pressure head portion formed on the connection terminal of said branch pipe, a joint piece provided externally on the fuel rail in such a manner as to enclose the pressure receiving bearing surface, and said branch pipe being fixed to said fuel rail by threadedly tightening a nut incorporated on said branch pipe with said joint piece, which connection structure is so designed that a spherical pressure bearing surface is formed on the terminal of said pressure head portion, a straight line portion is formed on said pressure head portion in continuity with said pressure bearing surface, and at the end of said straight line portion is formed an annular projection which comes in contact with said nut, the curvature radius of said pressure bearing surface being set at 0.4 D to 10 D, wherein D is the diameter of said branch pipe, and a guide being provided in the joint piece, the guide having an aperture concentric with the pressure receiving bearing surface and dimensioned for guiding the straight line portion formed on the pressure head portion for facilitating positioning and installation of the branch pipe.

2. The connection structure for the branch pipe in the high-pressure fuel rail according to claim (1), wherein the annular projection and the nut contact each other on a plane perpendicular to the axis of the branch pipe.

3. The connection structure for the branch pipe in the high-pressure fuel rail according to claim (1), wherein the annular projection and the nut contact each other on a plane diagonal to the axis of the branch pipe.

4. The connection structure for the branch pipe in the high-pressure fuel rail according to claim (3), wherein the annular projection is flexible.

5. The connection structure for the branch pipe in the high-pressure fuel rail according to claim (1), wherein the high-pressure fuel rail consists of a fuel manifold.

6. The connection structure for the branch pipe in the high-pressure fuel rail according to claim 1 wherein the fuel rail consists of a fuel block.

7. The connection structure for the branch pipe in the high-pressure fuel rail according to claim 1, wherein the curvature radius of said pressure bearing surface is set at 0.4 D to 4 D.

8. A connection structure for a branch pipe in a high-pressure fuel rail, the fuel rail having a peripheral wall defining an axially extending through passage therethrough for carrying a high-pressure fuel, the peripheral wall being characterized by at least one through hole aligned transverse to the through passage and communicating therewith, the peripheral wall further being characterized by an outwardly opening pressure receiving bearing surface surrounding the through hole, a cylindrical branch pipe having an outside diameter D, a flow path extending axially through the branch pipe and a connection terminal end on the branch pipe engaged with the outwardly opening pressure receiving bearing surface of the fuel rail such that the flow path of the branch pipe communicates with the through hole and the through passage of the fuel rail, a joint piece disposed externally on the fuel rail in such a manner as to enclose the pressure receiving bearing surface, said branch pipe being characterized by an annular projection spaced from the connection terminal end, a cylindrical portion extending from the annular projection to the connection terminal end, the connection terminal end defining a spherical pressure bearing surface having a curvature radius of between approximately 0.4 D to 10 D; a nut surrounding the branch pipe and engaging the annular projection thereon, said nut being threadedly tightenable with the joint piece to tightly fix the spherical pressure bearing surface defining the connection terminal end of the branch pipe to the outwardly opening pressure receiving bearing surface of the fuel rail, and a guide being provided in the joint piece, the guide having an aperture concentric with the pressure receiving bearing surface and dimensioned for guiding the cylindrical portion formed on the pressure head for facilitating positioning and installation of the branch pipe, whereby the spherical pressure bearing surface of the branch pipe enables substantial rectifying of alignment of the branch pipe relative to the through hole and achieves a substantially circular line of contact with the outwardly opening pressure receiving bearing surface of the fuel rail.

* * * * *